(12) United States Patent
Fukuhara et al.

(10) Patent No.: US 12,263,794 B2
(45) Date of Patent: Apr. 1, 2025

(54) VEHICLE CAMERA UNIT

(71) Applicants: SUBARU CORPORATION, Tokyo (JP); Kojima Industries Corporation, Aichi (JP)

(72) Inventors: Ryo Fukuhara, Tokyo (JP); Keiichiro Ito, Toyota (JP); Tomoyuki Shiono, Toyota (JP); Taichi Uozumi, Toyota (JP)

(73) Assignees: SUBARU CORPORATION, Tokyo (JP); Kojima Industries Corporation, Aichi (JP)

( * ) Notice: Subject to any disclaimer, the term of this patent is extended or adjusted under 35 U.S.C. 154(b) by 34 days.

(21) Appl. No.: 18/324,498

(22) Filed: May 26, 2023

(65) Prior Publication Data

US 2023/0415668 A1    Dec. 28, 2023

(30) Foreign Application Priority Data

Jun. 24, 2022  (JP) ................. 2022-101568

(51) Int. Cl.
   *B60R 11/04*     (2006.01)
   *B60R 1/12*      (2006.01)
   *B60R 11/00*     (2006.01)

(52) U.S. Cl.
   CPC .............. *B60R 11/04* (2013.01); *B60R 1/12* (2013.01); *B60R 2001/1253* (2013.01); *B60R 2011/0026* (2013.01); *B60R 2011/0033* (2013.01); *B60R 2011/0043* (2013.01)

(58) Field of Classification Search
   None
   See application file for complete search history.

(56) References Cited

U.S. PATENT DOCUMENTS

| | | | |
|---|---|---|---|
| 2012/0327525 A1* | 12/2012 | Lee .................. | G03B 13/32 359/823 |
| 2018/0345865 A1* | 12/2018 | Maxwell .................. | B60R 1/12 |
| 2019/0168684 A1* | 6/2019 | Higashimachi ...... | G03B 17/561 |
| 2020/0189465 A1 | 6/2020 | Kitajima et al. | |
| 2022/0371528 A1 | 11/2022 | Uozumi | |

FOREIGN PATENT DOCUMENTS

| | | |
|---|---|---|
| JP | 2020-093710 A | 6/2020 |
| JP | 2020-107459 A | 7/2020 |
| JP | 2022-179002 A | 12/2022 |

* cited by examiner

*Primary Examiner* — Eileen M Adams
(74) *Attorney, Agent, or Firm* — Rimon P.C.

(57) ABSTRACT

A vehicle camera unit includes a bracket, a lens hood, an imaging device, and a cover. The bracket is configured to be fixed to a windshield. The lens hood is configured to be detached from the bracket. The imaging device is attached to the lens hood. The cover covers the imaging device. The vehicle camera unit overlaps a back surface projection portion of an interior mirror or a display device having a function of the interior mirror, each of which is detachable in an inclination direction of the windshield. The lens hood is attached to the bracket detachably in the inclination direction of the windshield.

4 Claims, 9 Drawing Sheets

VEHICLE CAMERA UNIT

CROSS-REFERENCE TO RELATED APPLICATIONS

The present application claims priority from Japanese Patent Application No. 2022-101568 filed on Jun. 24, 2022, the entire contents of which are hereby incorporated by reference.

BACKGROUND

The present disclosure relates to a vehicle camera unit.

In general, on the front side of the interior of the vehicle, an interior mirror for the driver to visually recognize the rear side is fixedly attached to the upper portion of the interior.

Therefore, there is no problem in the case where the occupant seated in the driver's seat in front of the vehicle properly wears the seat belt, but when the occupant does not properly wear the seat belt, and in particular, when an impact due to a collision or the like is applied to the vehicle from the oblique front direction of the vehicle, it is also assumed that the occupant seated in the driver's seat is pushed toward the interior mirror due to the impact, and thus is brought into contact with the interior mirror.

Under the assumption of such a scene, there has been a technique of detaching an interior mirror by the load applied to the interior mirror when, for example, the head of the occupant seated in the driver's seat comes into contact with the interior mirror as disclosed in, for example, Japanese Unexamined Patent Application Publication (JP-A) No. 2020-93710.

However, even when the technique according to JP-A 2020-93710 is applied, the detachment of the interior mirror may be inhibited when a unit or the like overlaps the back surface projection portion of the interior mirror.

It is desirable to provide a vehicle camera unit that is disposed at a position overlapping the back surface projection portion of an interior mirror or a display device having a function of the interior mirror, and that is detached so as not to inhibit the detachment of the interior mirror when an impact is applied to the vehicle from the vehicle front direction.

SUMMARY

An aspect of the present disclosure provides a vehicle camera unit. The vehicle camera unit includes a bracket, a lens hood, an imaging device, and a cover. The bracket is configured to be fixed to a windshield. The lens hood is configured to be detached from the bracket. The imaging device is attached to the lens hood. The cover covers the imaging device. The vehicle camera unit overlaps a back surface projection portion of an interior mirror or a display device having a function of the interior mirror, each of which is detachable in an inclination direction of the windshield. The lens hood is attached to the bracket detachably in the inclination direction of the windshield.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

DETAILED DESCRIPTION

Embodiment

Hereinafter, a vehicle camera unit 1 according to the present embodiment will be described with reference to FIGS. 1 to 12. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. In FIGS. 1 to 12, the front side of the vehicle is indicated by an arrow FR, the rear side of the vehicle is indicated by an arrow BK, the upper side of the vehicle is indicated by an arrow UP, the left side of the vehicle when viewed from the vehicle upper side (one side in the vehicle width direction) is indicated by an arrow LH, and the right side of the vehicle (the other side in the vehicle width direction) is indicated by an arrow RH. In the following description, unless otherwise specified, the description using the upper-lower, front-rear, and left-right directions indicates the vehicle up-down direction, the vehicle front-rear direction, and the vehicle left-right direction.

Attachment Structure

Figure 1:
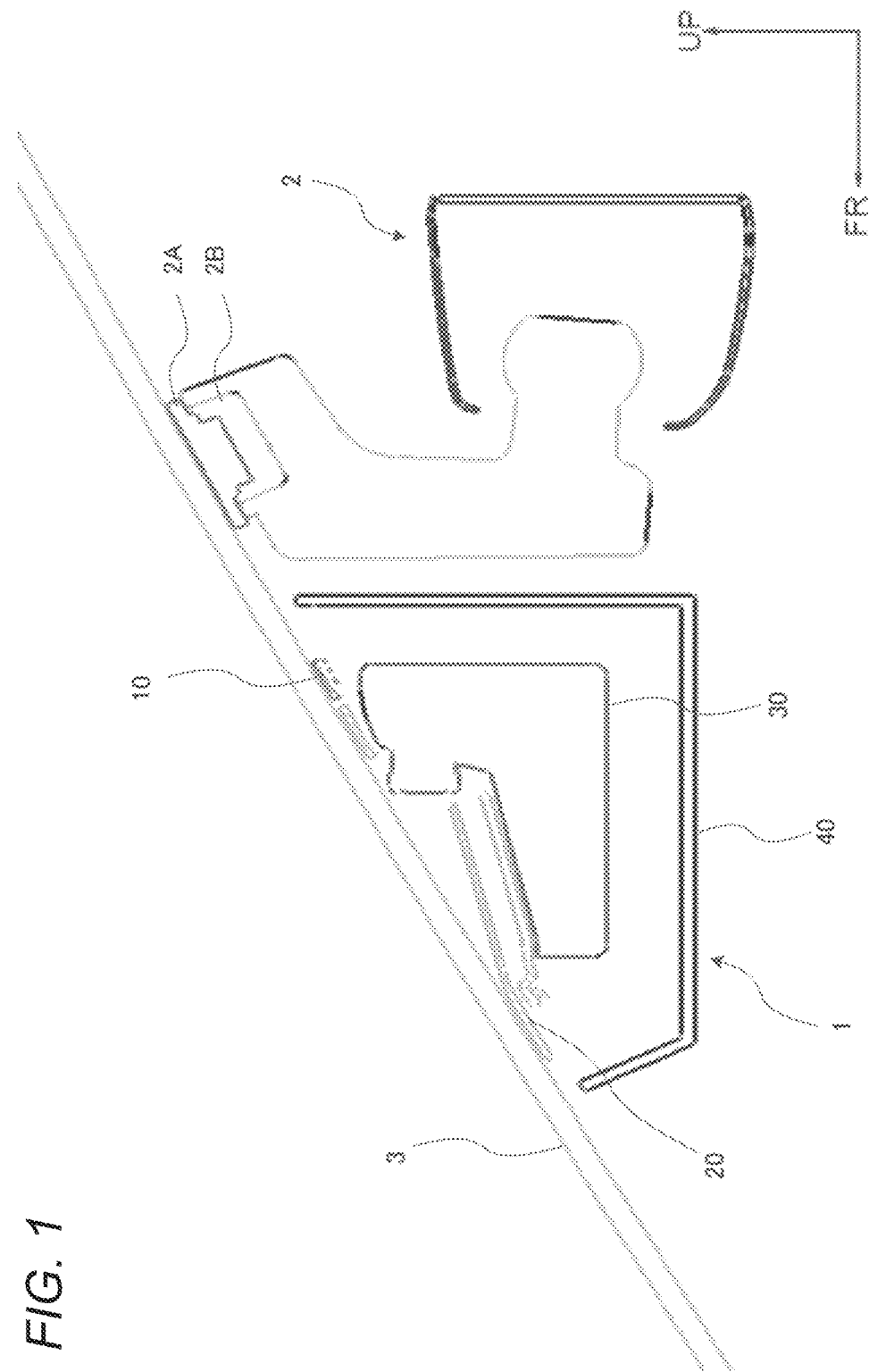
FIG. 1 is a cross-sectional view of an attachment structure of a vehicle camera unit according to an embodiment of the present disclosure, as viewed from the vehicle front side.

As shown in FIG. 1, the vehicle camera unit 1 is detachably mounted at a position overlapping the back surface projection portion of the interior mirror 2 mounted detachably in the inclination direction of the windshield 3. In addition, the vehicle camera unit 1 is spaced apart from the interior mirror 2 toward the vehicle front side, and is attached to the central portion in the left-right direction of the windshield 3. Further, the interior mirror 2 is detachable in response to an impact applied to the front surface side of the interior mirror 2.

Further, in the vehicle camera unit 1, when an impact such that the interior mirror 2 is detached is applied to the vehicle front side, the lens hood 20, which will be described later, is detachable from the bracket 10 due to an impact force of the collision of the detached interior mirror 2. For example, the interior mirror 2 is detached when an impact such that the interior mirror 2 is detached is applied to the vehicle front side. When the detached interior mirror 2 collides with a cover to be described later, the cover is detached or the fixing portion of the cover 40 is broken. Thereafter, the lens hood 20, which will be described later, is detachable from the bracket 10 due to an impact force of the cover 40 colliding with an imaging device 30 to be described later. The present embodiment has exemplified the interior mirror 2, but may be a display device having the same function as that of the interior mirror 2. In this case, the display device has a detachment mechanism similar to that of the interior mirror 2.

Configuration of Vehicle Camera Unit 1

Figure 2:
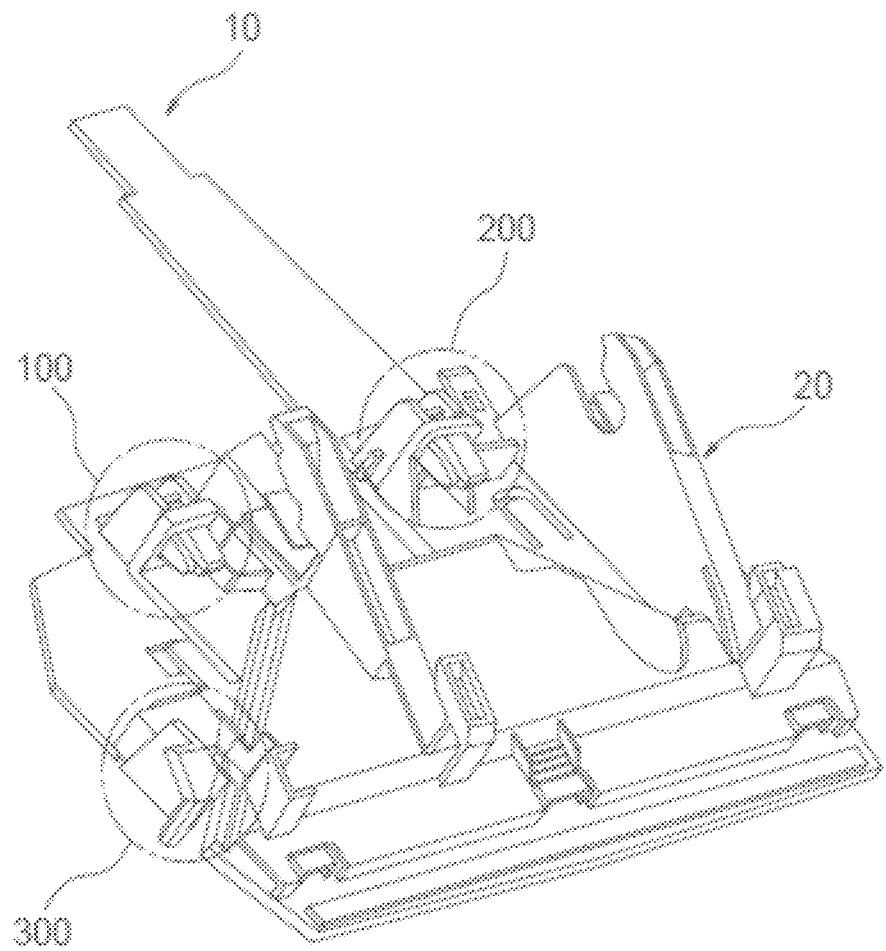
FIG. 2 is a view showing an assembled state of the lens hood with respect to the bracket according to the embodiment of the present disclosure.
Figure 3:
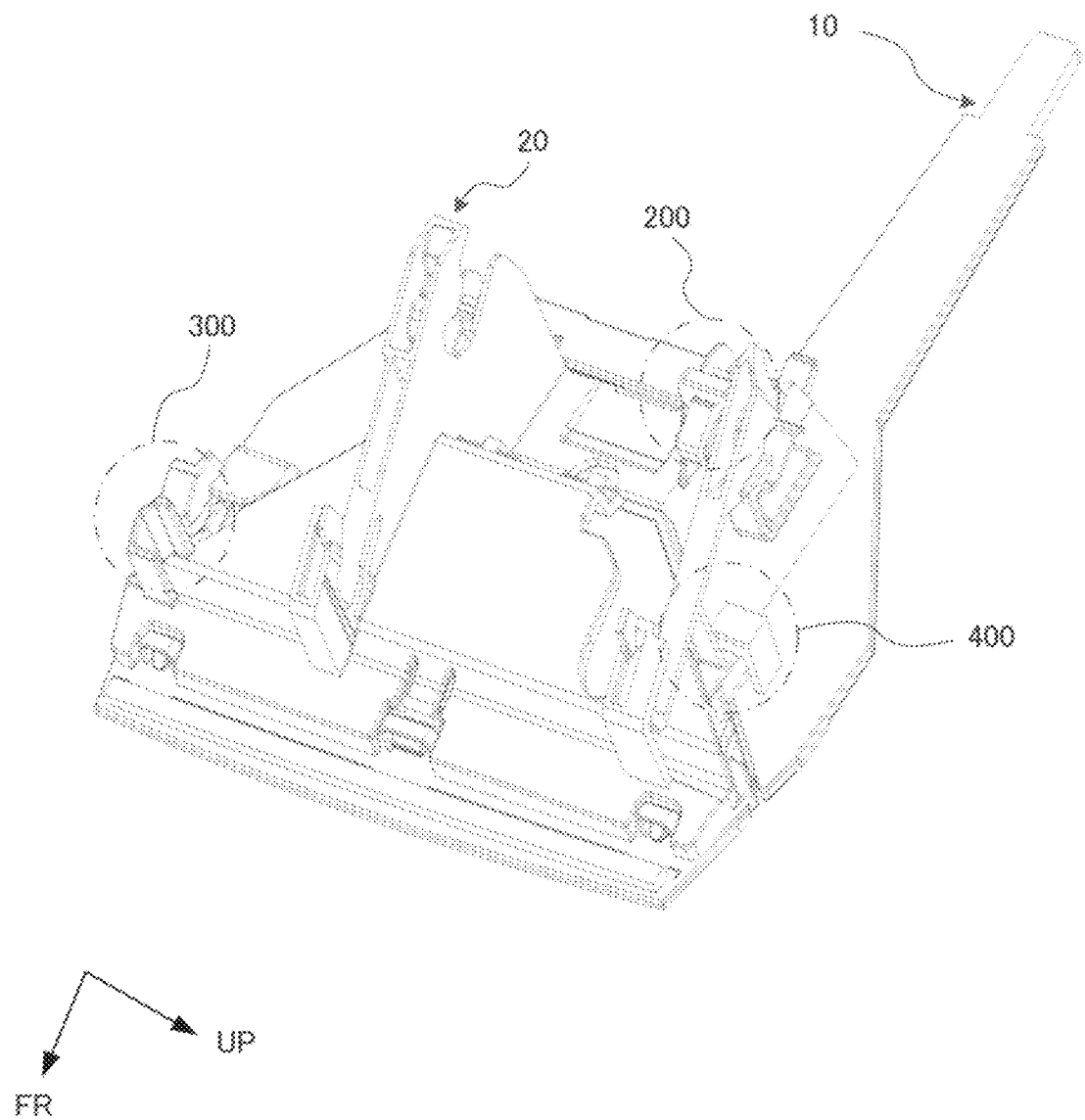
FIG. 3 is a view showing an assembled state of the lens hood with respect to the bracket according to the embodiment of the present disclosure.

The vehicle camera unit 1 includes a bracket 10, a lens hood 20, an imaging device and a cover 40. As shown in FIGS. 2 and 3, when the lens hood 20 is assembled to the bracket 10, the vehicle camera unit 1 is formed with a first fixing portion 100, a second fixing portion 200, a first rotation-restricting portion 300, and a second rotation-restricting portion 400.

As shown in FIG. 1, the bracket 10 is fixed to the windshield 3 by an adhesive or the like applied to the back surface side of the surface facing the lens hood 20.

The lens hood 20 is assembled to the bracket 10 detachably in response to an impact force of the collision of the detached interior mirror 2 when an impact is applied to the vehicle from the vehicle front side such that the interior mirror 2 is detached.

Fixing Structure of Vehicle Camera Unit 1

Figure 4:
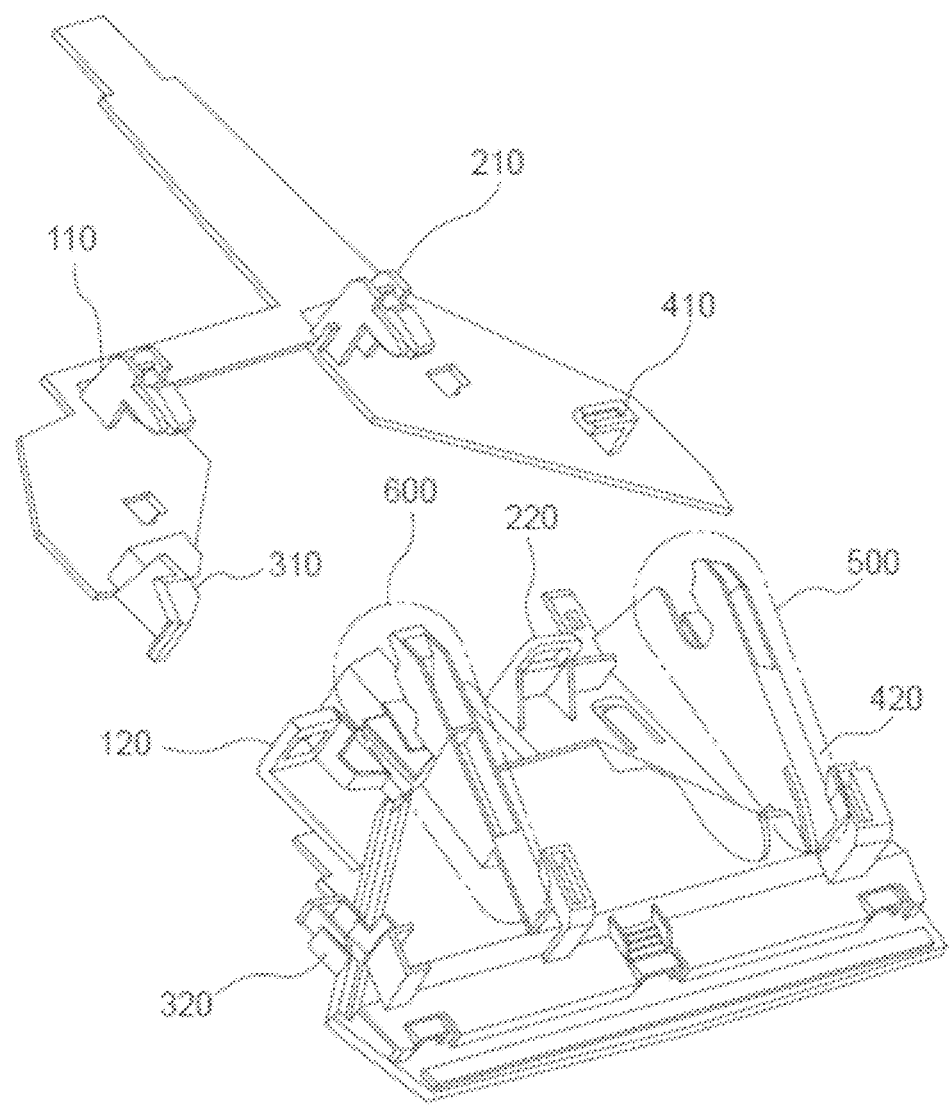
FIG. 4 is an exploded view of the bracket and the lens hood according to the embodiment of the present disclosure.
Figure 4:
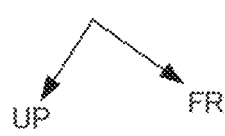
Figure 5:
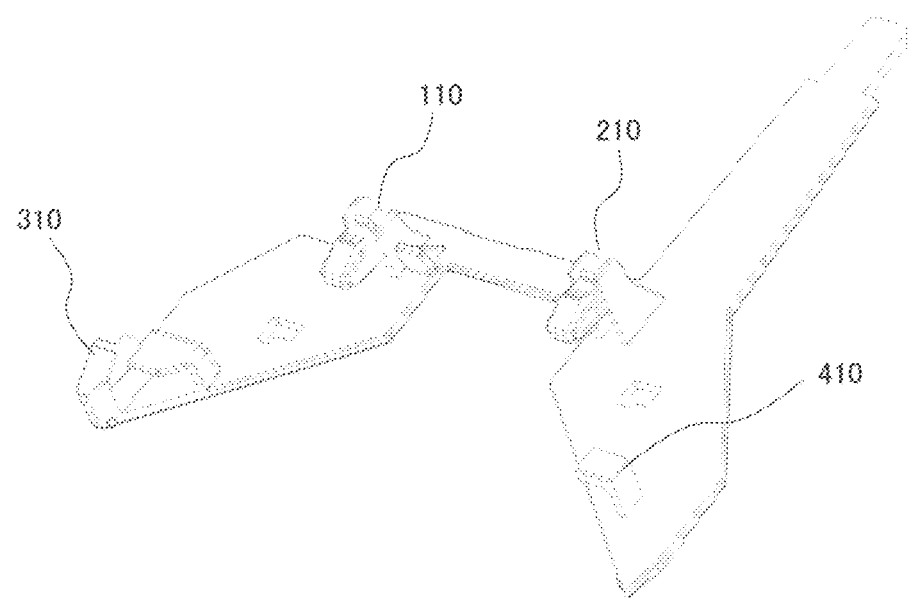
FIG. 5 is a perspective view of the bracket according to the embodiment of the present disclosure.

As shown in FIGS. 4 and 5, the bracket 10 includes a first fixing member 110 forming a part of the first fixing portion 100, a second fixing member 210 forming a portion of the second fixing portion 200, a first rotation-restricting member 310 forming a portion of the first rotation-restricting portion 300, and a second rotation-restricting member 410 forming a portion of the second rotation-restricting portion 400.

Figure 6:
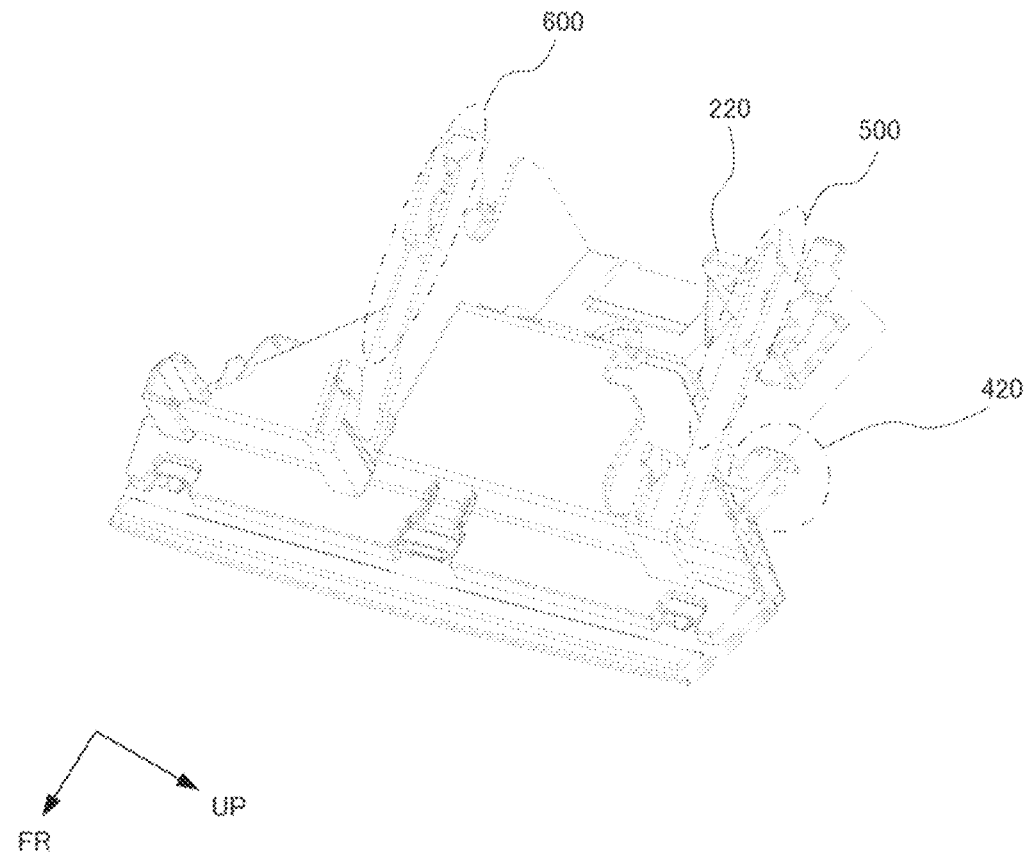
FIG. 6 is a perspective view of the lens hood according to the embodiment of the present disclosure.

As shown in FIGS. 4 and 6, the lens hood 20 includes a first fixed member 120 forming a part of the first fixing portion 100, a second fixed member 220 forming a part of the second fixing portion 200, a first rotation-restricted member 320 forming a part of the first rotation-restricting portion 300, a second rotation-restricted member 420 forming a part of the second rotation-restricting portion 400, a first imaging device fitting member 500, and a second imaging device fitting member 600.

Figure 7:
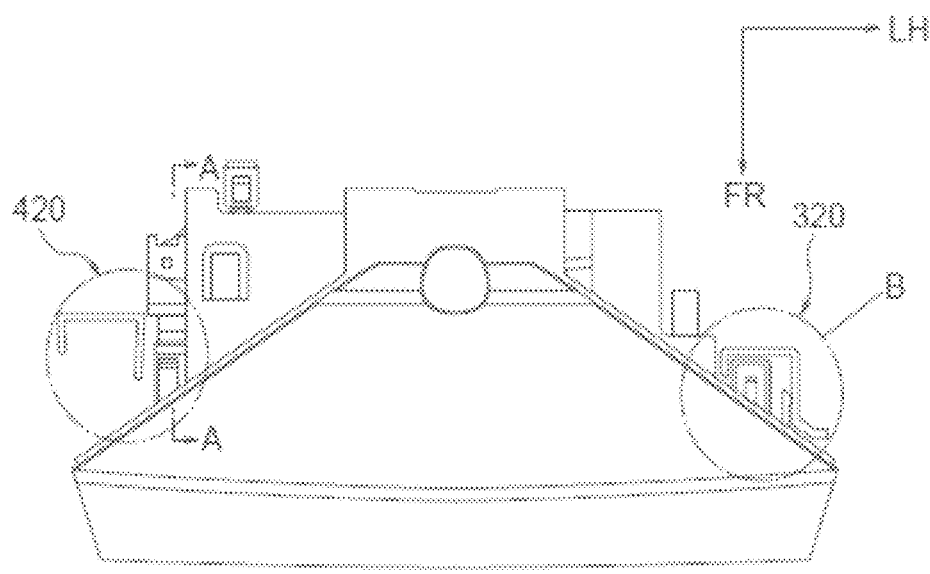
FIG. 7 is a plan view of the vehicle camera unit according to the embodiment of the present disclosure, as viewed from the vehicle upper front side.

FIG. 7 is a plan view of the vehicle camera unit 1 as viewed from an upper front portion of the vehicle, in which the left side of the paper is provided with the second rotation-restricted member 420 forming a part of the second rotation-restricting portion 400, and the right side of the paper is provided with the first rotation-restricted member 320 forming a part of the first rotation-restricting portion 300.

Figure 8:
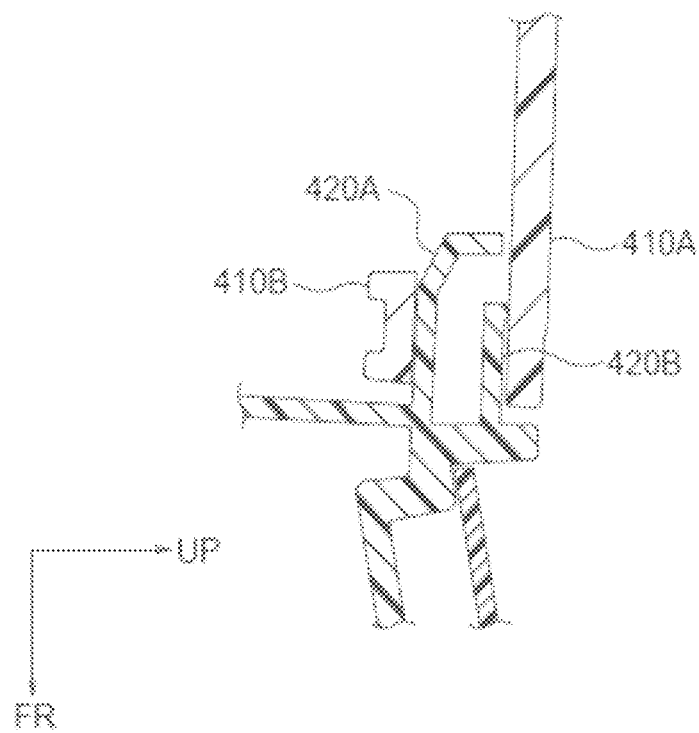
FIG. 8 is a cross-sectional view taken along line A-A in FIG. 7 of the vehicle camera unit according to the embodiment of the present disclosure.

As shown in FIG. 8, an extending wall 420A of the second rotation-restricted member 420 is in contact with a secondary wall 410B of the second rotation-restricting member 410 located on the vehicle lower side. An engaging wall 420B of the second rotation-restricted member 420 is fitted to the main wall 410A of the second rotation-restricting member 410 so that a convex portion of the distal end thereof is wrapped toward the vehicle upper side.

Figure 9:
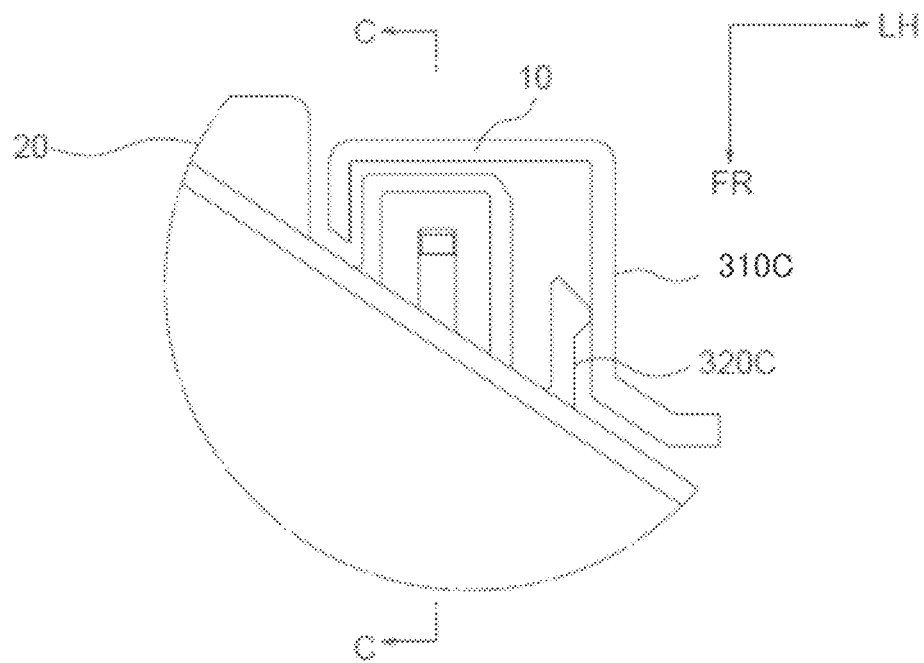
FIG. 9 is an enlarged view of portion B in FIG. 7 of the vehicle camera unit according to the embodiment of the present disclosure.
Figure 10:
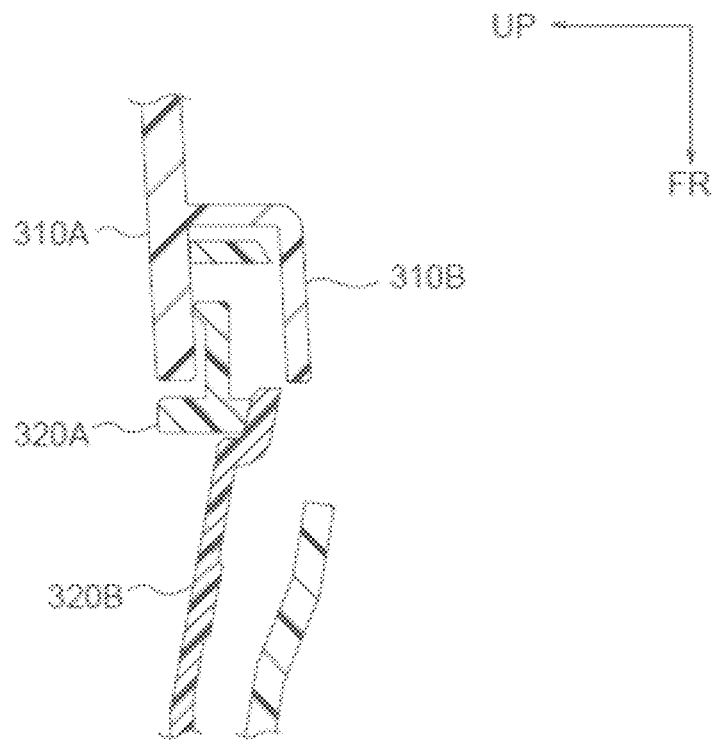
FIG. 10 is a cross-sectional view taken along line C-C in FIG. 9 of the vehicle camera unit according to the embodiment of the present disclosure.

As shown in FIG. 10, the first rotation-restricting member 310 includes a base wall 310A and an L-shaped protruding wall 310B protruding from the base wall 310A. A distal end convex portion of the engaging wall 320A, which is engaged with the holding wall 320B of the first rotation-restricted member 320 from the vehicle front direction, is fitted to the base wall 310A of the first rotation-restricting member 310 in a manner wrapped toward the vehicle upper side. As shown in FIG. 9, a convex portion at the distal end of the engaging wall 320C of the first rotation-restricted member 320 is engaged with a bent stretching wall 310C of the first rotation-restricting member 310 in the vehicle width direction so as to be pushed in.

Figure 11:
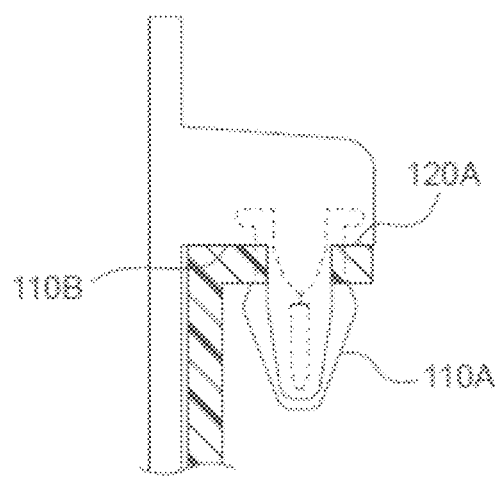
FIG. 11 is a cross-sectional view of a first fixing portion and a second fixing portion of the vehicle camera unit according to the embodiment of the present disclosure.

The first fixing member 110 and the second fixing member 210 have the same structure. The first fixed member 120 and the second fixed member 220 have the same structure. As shown in FIG. 11, in the first fixing member 110, for example, a resin clip 110A as a fitting fixing member is fitted, and a U-shaped elastic portion is exposed.

The first fixed member 120 is formed as a rectangular opening. When the resin clip 110A of the first fixing member 110 is pushed in, the free end of the U-shaped elastic portion of the resin clip 110A is elastically deformed. When pushed in until the wall 110B of the first fixing member 110 and the wall 120A forming the rectangular opening of the first fixed member 120 come into contact with each other, the resin clip 110A is recovered to the original U-shape and fixed. The present embodiment has exemplified the resin clip 110A, but may use a metal clip.

The first imaging device fitting member 500 and the second imaging device fitting member 600 have the same fitting structure. Here, the imaging device 30 may be, for example, a monocular camera unit for imaging a person, a vehicle, a feature, or the like in front of the vehicle.

Figure 12:
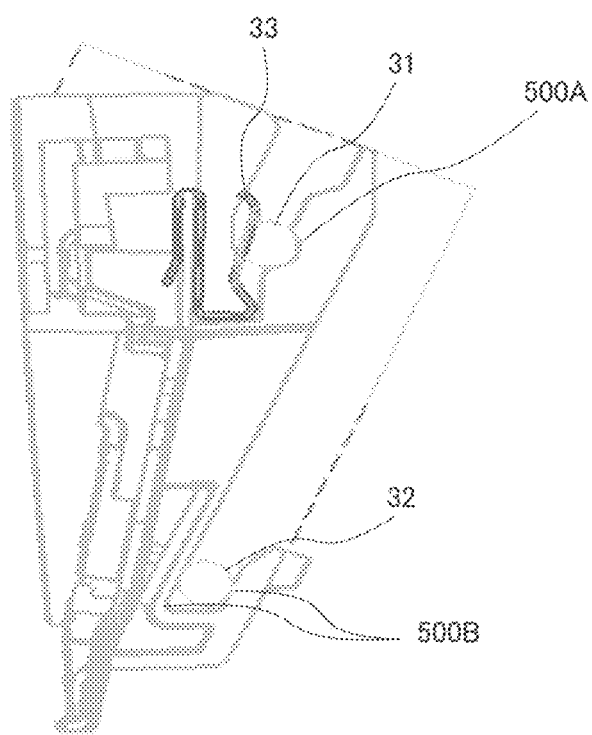
FIG. 12 is a view showing an assembling structure of the imaging device with respect to the lens hood in the vehicle camera unit according to the embodiment of the present disclosure.

As shown in FIG. 12, the lens hood 20 has a first fitting groove 500A fitted to the first fitting protrusion 31 of the imaging device 30 and a second fitting groove 500B fitted to the second fitting protrusion 32 of the imaging device 30.

As shown in FIG. 12, the depth of the first fitting groove portion 500A is provided with a plate spring 33, and the shape of the groove facing the elastic deformation portion of the plate spring 33 is concave.

As shown in FIG. 12, the distal end of the second fitting groove portion 500B is shaped to hold the distal end of the second fitting protrusion 32. The distal ends of the first fitting protrusion 31 and the second fitting protrusion 32 have a curved shape.

When the first fitting protrusion 31 and the second fitting protrusion 32 of the imaging device 30 are inserted into the first fitting groove 500A and the second fitting groove 500B to be fitted, during the insertion, the first fitting protrusion 31 enters while elastically deforming the plate spring. When the curved surface shape portion of the distal end of the first fitting protrusion 31 falls into the recess of the first fitting groove 500A, the fitting is accomplished by the biasing of the plate spring.

Fixing Structure of Interior Mirror 2

The fixing portion of the interior mirror 2 includes, for example, a base 2A and a mount 2B.

The base 2A includes an upper surface fixed to the vehicle, a lower surface opposite to the upper surface, a first side surface disposed between the lower surface and the upper surface, and a second side surface disposed opposite to the first side surface.

The mount 2B includes a bottom surface facing the lower surface, a first side wall erected from the bottom surface in a manner facing the first side surface of the base, and a second side wall erected from the bottom surface in a manner facing the second side surface of the base 2A. The thickness of the first side wall in the direction from the first side wall toward the second side wall is smaller in the portion closer to the bottom surface than the portion farther from the bottom surface. The mount 2B is slid to be attached to the base 2A while surrounding the first side surface, the lower surface, and the second side surface.

That is, the mount 2B is provided with the bottom surface, the first side wall, and the second side wall, and the thickness of the first side wall in the left-right direction is smaller in the portion closer to the bottom surface than the portion farther from the bottom surface. Therefore, when an impact is applied, the first side wall is broken by the impact, so that the interior mirror 2 can be easily detached due to the impact.

Operation and Effect

As described above, in the interior mirror 2, the mount 2B holding the base 2A including the upper surface fixed to the vehicle, the lower surface opposite to the upper surface, the first side surface disposed between the lower surface and the upper surface, and the second side surface disposed opposite to the first side surface is provided with the bottom surface, the first side wall, and the second side wall. The thickness of the first side wall in the left-right direction is smaller in the portion closer to the bottom surface than the portion farther from the bottom surface. Therefore, when an impact is applied to the vehicle and a direct impact is applied to the interior mirror 2 due to the impact, the first side wall is broken due to the direct impact force, and the interior mirror 2 can be easily detached. On the other hand, when an impact such that the interior mirror 2 is detached is applied to the vehicle front side, the lens hood 20 is detached from the bracket 10 due to the impact force of the collision of the detached interior mirror 2. That is, the interior mirror 2 is detached when an impact such that the interior mirror 2 is detached is applied to the vehicle front side. When the detached interior mirror 2 collides with the cover 40, the cover 40 is detached or the fixing portion of the cover 40 is broken. Thereafter, the lens hood 20 is detached from the bracket 10 due to an impact force of the cover 40 colliding with an imaging device 30. Therefore, since the vehicle camera unit 1 overlapping the back surface projection portion of the interior mirror 2 is detached and drops earlier than the interior mirror 2, it is possible to prevent the detachment of the interior mirror 2 from being inhibited.

The first fixing portion 100 (second fixing portion 200) of the vehicle camera unit 1 includes the first fixed member 120 provided to the lens hood 20 and the first fixing member 110 provided to the bracket 10. In the first fixing member 110, for example, the resin clip 110A as the fitting fixing member is fitted, and the U-shaped elastic portion is exposed. The first fixed member 120 is formed as a rectangular opening. When the resin clip 110A of the first fixing member 110 is pushed in, the free end of the U-shaped elastic portion of the resin clip 110A is elastically deformed. When the resin clip 110A is pushed in until the wall 110B of the first fixing member 110 and the wall 120A as the rectangular opening of the first fixed member 120 come into contact with each other, the resin clip 110A is recovered to the original U-shape and fixed. On the other hand, when an impact such that the interior mirror 2 is detached is applied to the vehicle from the vehicle front side, an impact force of the collision of the detached interior mirror 2 acts in a direction opposite to the assembling direction of the first fixing portion 100 (second fixing portion 200). Due to this impact force, the free end of the U-shaped elastic portion of the resin clip 110A, which is the fitting fixing member of the first fixing member 110, is elastically deformed, and is recovered into the original U-shape and detached after passing through the rectangular opening of the first fixed member 120. Therefore, when an impact is applied to the vehicle from the vehicle front side such that the interior mirror 2 is detached, due to the action of the impact force applied by the detached interior mirror 2 colliding with the first fixed member 120 and the second fixed member 220 of the lens hood 20 in the vehicle camera unit 1 overlapping the back surface projection portion of the interior mirror 2, the first fixed member 120 and the second fixed member 220 of the lens hood 20 are detached from the first fixing member 110 and the second fixing member 210 of the bracket 10. Therefore, the lens hood 20 can be fixed to and detached from the bracket 10 with a simple structure.

The extending wall 420A of the second rotation-restricted member 420 of the lens hood 20 is in contact with a secondary wall 410B of the second rotation-restricting member 410 located in the vehicle lower direction of the bracket 10. The engaging wall 420B of the second rotation-restricted member 420 is fitted to the main wall 410A of the second rotation-restricting member 410 so that the convex portion of the distal end thereof is wrapped in the vehicle upper direction. The first rotation-restricting member 310 of the bracket 10 includes the base wall 310A and the L-shaped protruding wall 310B protruding from the base wall 310A. The distal end convex portion of the engaging wall 320A, which is engaged with the holding wall 320B of the first rotation-restricted member 320 of the lens hood 20 from the vehicle front direction, is fitted to the base wall 310A of the first rotation-restricting member 310 in a manner wrapped in the vehicle upper direction. The engaging wall 320C of the lens hood 20 is in contact with the bent stretching wall 310C of the bracket 10 in the vehicle width direction. Therefore, since the impact force acts in the direction opposite to the assembling direction of the first rotation-restricting portion 300 and the second rotation-restricting portion 400, the second rotation-restricted member 420 and the first rotation-restricted member 320 of the lens hood 20 are detached from the first rotation-restricting member 310 and the second rotation-restricting member 410 of the bracket 10 in synchronization with the first fixed member 120 and the second fixed member 220 of the lens hood 20. Therefore, the lens hood 20 can be detached from the bracket 10 with a simple structure.

The extending wall 420A of the second rotation-restricted member 420 of the lens hood 20 is in contact with a secondary wall 410B of the second rotation-restricting member 410 located in the vehicle lower direction of the bracket 10. The engaging wall 420B of the second rotation-restricted member 420 is fitted to the main wall 410A of the second rotation-restricting member 410 so that the convex portion of the distal end thereof is wrapped in the vehicle upper direction. That is, the second rotation-restricted member 420 of the lens hood restricts the rotation of the vehicle in the upper-lower direction with respect to the second rotation-restricting member 410 of the bracket 10. Therefore, the first rotation-restricting portion 300 fixes the lens hood 20 to the bracket 10 and also functions for the rotation restriction in the pitch direction of the lens hood 20.

The first rotation-restricting member 310 of the bracket 10 includes the base wall 310A and the L-shaped protruding wall 310B protruding from the base wall 310A. The distal end convex portion of the engaging wall 320A, which is engaged with the holding wall 320B of the first rotation-restricted member 320 of the lens hood 20 from the vehicle front direction, is fitted to the base wall 310A of the first rotation-restricting member 310 in a manner wrapped toward the vehicle upper side. The engaging wall 320C of the lens hood 20 is in contact with the bent stretching wall 310C of the bracket 10 in the vehicle width direction. That is, the first rotation-restricted member 320 of the lens hood 20 restricts the rotation of the vehicle in the lower direction and the width direction with respect to the second rotation-restricting member 410 of the bracket 10. Therefore, the second rotation-restricting portion 400 fixes the lens hood 20 to the bracket 10 and also functions for the rotation restriction in the pitch direction and the yaw direction of the lens hood 20.

An exemplary embodiment of the present disclosure has been explained above with reference to the drawings, whereas specific configurations of the present disclosure are not limited to the embodiment, and other designs or the like within the scope of the present disclosure are also included in the disclosure. For example, the present embodiment has exemplified the structure in which the first fixed member 120 and the second fixed member 220 of the lens hood 20 are detached from the first fixing member 110 and the second fixing member 210 of the bracket 10 due to the impact force of the interior mirror 2 being detached and coming into contact with the vehicle camera unit 1. However, for example, in a case where an impact is applied to the vehicle from the vehicle front side such that the interior mirror 2 is detached, the detachment from the first fixing member 110 and the second fixing member 210 of the bracket 10 may be caused by the action of the inertial force generated by the impact.

The invention claimed is:

1. A vehicle camera unit comprising:
a bracket configured to be fixed to a windshield;
a lens hood configured to be detached from the bracket;
a first fixing portion and a second fixing portion disposed along a direction intersecting an inclination direction of the windshield, and configured to detachably attach the lens hood to the bracket;
an imaging device attached to the lens hood; and
a cover that covers the imaging device,
wherein the vehicle camera unit overlaps a back surface projection portion of an interior mirror or a display device having a function of the interior mirror, and the interior mirror or the display device is attached to the windshield,
wherein the interior mirror or the display device is configured to detach from the windshield due to impact force applied to the interior mirror or the display device along an inclination direction of the windshield, and
wherein the first fixing portion and the second fixing portion are configured to allow the lens hood to detach from the bracket upon receiving impact force from the interior mirror or the display device detached from the windshield.

2. The vehicle camera unit according to claim 1, wherein fixing members of the first fixing portion and the second fixing portion are resin clips.

3. The vehicle camera unit according to claim 1, wherein fixing members of the first fixing portion and the second fixing portion are metal clips.

4. The vehicle camera unit according to claim 1, further comprising a first rotation-restricting portion and a second rotation-restricting portion spaced apart from the first fixing portion and the second fixing portion disposed in the direction intersecting the inclination direction of the windshield, and configured to restrict rotation in a pitch direction or a yaw direction, and to detach the lens hood from the bracket together with the first fixing portion and the second fixing portion upon receiving the impact force from the interior mirror or the display device detached from the windshield.

* * * * *